United States Patent [19]

Lauderbach et al.

[11] Patent Number: 4,932,926
[45] Date of Patent: Jun. 12, 1990

[54] BELT DRIVE SYSTEM

[75] Inventors: Leo Lauderbach, Steinbach; Klaus Ruffertshöfer, Urbar; Werner Rohrmoser, Koblenz-Pfaffendorf; Hans Pohlenz, Boppard, all of Fed. Rep. of Germany

[73] Assignee: Stabilus GmbH, Koblenz-Neuendorf, Fed. Rep. of Germany

[21] Appl. No.: 409,263

[22] Filed: Sep. 18, 1989

Related U.S. Application Data

[63] Continuation of Ser. No. 244,729, Sep. 15, 1988, abandoned.

[30] Foreign Application Priority Data

Sep. 24, 1987 [DE] Fed. Rep. of Germany ....... 3732097

[51] Int. Cl.⁵ .............................................. F16H 7/12
[52] U.S. Cl. .................................. 474/110; 474/135
[58] Field of Search .................... 474/101, 109–111, 474/113–117, 133–135, 136, 138

[56] References Cited

FOREIGN PATENT DOCUMENTS 2144688  3/1973  Fed. Rep. of Germany ...... 474/110
2819608 11/1979  Fed. Rep. of Germany ...... 474/110

*Primary Examiner*—Thuy M. Bui
*Attorney, Agent, or Firm*—Brumbaugh, Graves, Donohue & Raymond

[57]  ABSTRACT

In a belt drive, a tensioning roller acts onto a section of a belt. The tensioning roller is biased along a tensioning roller movement path such as to provide a tension of the belt. The tension of the belt is responsive to the driving direction of the belt. A higher tension occurs in a normal driving direction of the belt, and a lower tension occurs in a reverse driving direction of the belt. In the reverse driving direction of the belt there is a risk of disengagement between the belt and respective belt pulleys. A damper is provided for damping the movement of the tensioning roller along the tensioning roller movement path. In order to prevent disengagement of the belt and the respective belt pulleys, the damper is locked when a reverse driving direction occurs and/or when operational conditions occur under which there is a likelihood of the reverse driving direction to occur.

14 Claims, 3 Drawing Sheets

BELT DRIVE SYSTEM

This application is a continuation of application Ser. No. 07/244,729, filed on 9/15/88 now abandoned.

BACKGROUND OF THE INVENTION

Belt drive systems are frequently used, particularly for driving auxiliary units associated to an internal combustion engine. For providing a tension in the belt of such a belt drive system, a tensioning roller acts onto the belt. The tensioning roller is under the action of biasing spring means. For damping the tensioning roller movement, a damper unit is provided. In many cases, the tension of the drive belt is dependent on the running direction of the drive belt. In a first or normal driving direction, the belt tension is sufficient for maintaining the belt in driving engagement with respective belt pulleys. If the driving direction is reversed, a reduction of the belt tension occurs, and this reduced tension may result in a disengagement of the belt and the respective pulleys. Normal damping of the tensioning roller cannot prevent this disengagement of the belt and the belt pulleys if a reversal of the driving direction occurs.

A reversal of the driving direction is particularly to be expected with internal combustion engines, and more particularly with diesel engines, when the operation is interrupted.

OBJECT OF THE INVENTION

It is an object of the present invention to provide a belt drive system in which the danger of disengagement between the belt and the belt pulleys is suppressed even on occurrence of a reversal of the driving direction.

SUMMARY OF THE INVENTION

A belt drive system comprises at least two belt pulleys. A belt member drivingly interconnects said belt pulleys. A tensioning member acts onto a belt section of said belt member between said pulleys. Said tensioning member is biased against said belt section along a tensioning member movement path such as to provide a belt tension. Said belt tension is responsive to the driving direction of said belt drive system. A higher tension of said belt member occurs in a normal driving direction of said belt drive system and a lower belt tension occurs in a reverse driving direction of said belt drive system. A damping unit acts onto said tensioning member for damping the movement of said tensioning member along said tensioning member movement path. Said damping unit comprises two damper components movable with respect to each other in response to the movement of said tensioning member along said tensioning member movement path. Damping means provide a damping force resisting to relative movement of said damper components. Damping force control means are provided for varying said damping force. Said damping force control means are controlled such that said damping force is increased in response to the occurrence of at least one of the following situations:

(a) reverse driving direction of the belt drive system occurs;

(b) operational conditions occur under which occurrence of the reverse driving direction of the belt drive system is expectable.

The damping force may be increased such that the movement of the tensioning member along its movement path is completely locked. If the movement of the damper components is completely locked the tensioning roller cannot further move against the biasing force, so that the tension of the belt member is maintained even on reversal of the driving direction. If, for example, the belt drive system is used for driving an auxiliary unit, like an electric generator or a water pump or a ventilator of a diesel engine, the damper may be locked in response to the interruption of the electrical ignition circuit by an ignition lock. If the ignition circuit is interrupted, the diesel engine comes to a standstill, and in this situation there is a likelihood of disengagement of the belt member and the belt pulleys due to the reduced tension in the belt pulley. As however, as stated above, the damper is locked in response to the interruption of the ignition circuit, the risk of such disengagement is suppressed.

According to a preferred embodiment of the invention, a fluid-operated damping unit is used. Such a fluid-operated damping unit comprises two damper components movable with respect to each other in response to the movement of said tensioning member along said tensioning member movement path. Said damper components define at least two fluid spaces, the volume ratio of which is variable in response to relative movement of said damper components. Said fluid spaces are interconnected by fluid passage means allowing a fluid flow between said fluid spaces in opposite directions respectively in response to the direction of movement of said tensioning member along said tensioning member movement path. Fluid passage control means are provided for reducing the flow cross section of said fluid passage means for at least that flow direction which corresponds to the direction of movement of said tensioning member resulting in a reduced tension of said belt member. Said fluid passage control means are controlled such that said flow cross section is reduced in response to the occurrence of at least one of the following situations:

(a) reverse driving direction of the belt drive system occurs;

(b) operational conditions occur under which occurrence of the reverse driving direction of the belt drive system is expectable.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there is illustrated and described a preferred embodiment of the invention.

BRIEF DESCRIPTION OF THE DRAWINGS

The invention will be explained in greater detail hereinafter with reference to embodiments shown in the accompanying drawings, in which.

DESCRIPTION OF THE PREFERRED EMBODIMENTS

Figure 4:
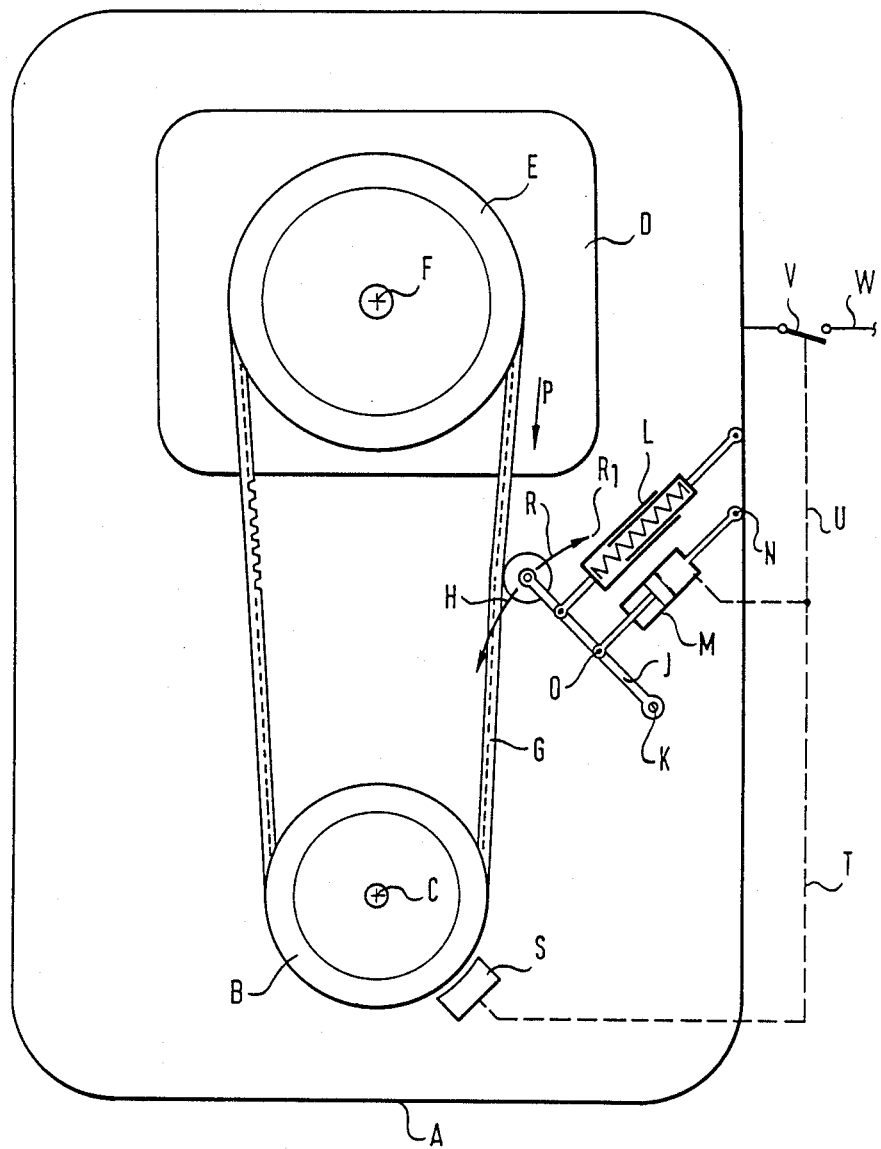
FIG. 4 shows a belt drive system using a damping unit as illustrated in one of FIGS. 1, 2, 3.

In FIG. 4, a diesel engine is designated by A. This diesel engine has a belt pulley B on an output shaft C.

An auxiliary unit, like a water pump D, is fastened to the diesel engine A. This auxiliary unit D comprises a further belt pulley E which is connected with a rotor of the auxiliary unit by a shaft F. A belt member G interconnects the belt pulleys B and E. A tensioning roller H acts onto an unsupported intermediate section of the belt member G extending between the belt pulleys E and B. This tensioning roller H is mounted on a rocking lever I. This rocking lever I is pivotally mounted in a pivot K. A biasing spring unit L acts onto the rocking lever I such as to bias the tensioning roller H against a belt member G. A damping unit M also acts onto the rocking lever I. The damping unit M is supported by a pivot means N fastened to a diesel engine A and is connected by pivot means O to the rocking lever I.

The normal driving direction of the belt member G is indicated by an arrow P. In an operation corresponding to the arrow P, the belt member G is subjected to a tension which is sufficient to prohibit disengagement of the belt member G from the pulleys. If the driving direction of the belt member G is reversed, a reduction of the tension in the belt member G occurs. This may be a result of the specific arrangement of the tensioning roller H on the rocking lever I and the angle included between the rocking lever I and the unsupported section of the belt member G. The damping unit M is used for damping the tensioning roller H along a movement path R. In normal operation according to arrow P, the tension of the belt member G is primarily due to the spring force of the biasing spring unit L. This tension is however increased by a torque exerted onto the rocking lever I as a result of the engagement of the belt member G and the tensioning roller H. When the driving direction is reversed, this torque does not further occur and the tension of the belt member G is only obtained by the spring force of the biasing spring unit L. So the tension of the belt member G is reduced with the result that the belt member G can disengage from one or both of the belt pulleys B and E. This danger is however eliminated by the specific construction of the damping unit M. While, in normal operation, the damper unit M damps the movement of the tensioning roller H along the movement path R, and more particularly, the movement in the direction $R_1$, on reversal of the driving direction, the damping unit L is locked. So the tension roller H is prevented from escaping in the direction of arrow $R_1$. As a result thereof, the tension in the belt member G is maintained even on reversal of the driving direction.

A direction sensing unit S is attached to the belt pulley B. This direct sensing unit delivers by line T a direction reversal signal to the damping unit M when reversal of the direction occurs. By this direction reversal signal, damping unit M is locked. Alternatively, a control line U connects an ignition lock V with the damping unit M, so that, on interruption of the ignition circuit W, the damping unit M is locked. If, as a result of the interruption of the ignition circuit W, the diesel engine A rotates in a direction reverse to the normal operational direction, the damping unit M is already locked and no reduction of tension can occur in the belt member G.

Figure 1:
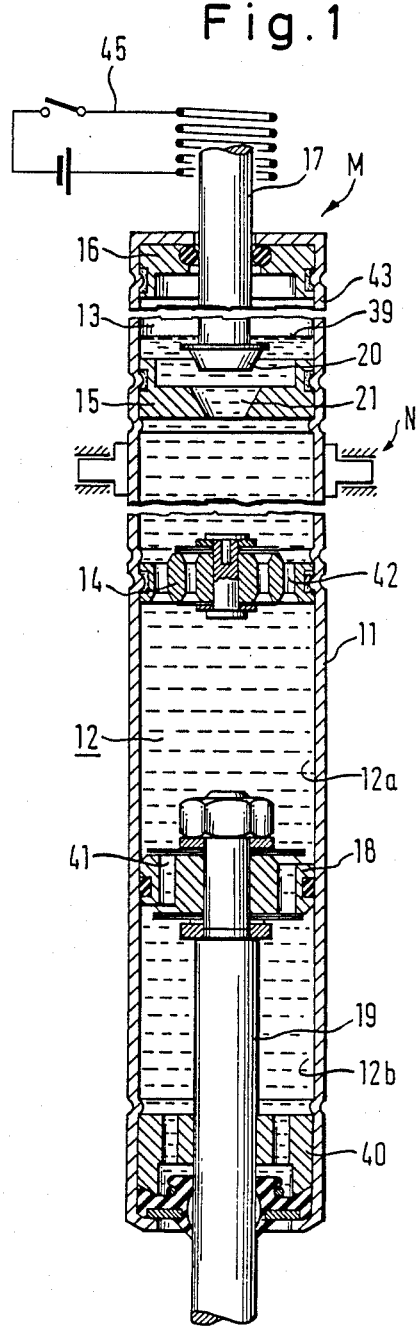
FIG. 1 shows a first embodiment of a damping unit.
Figure 3:
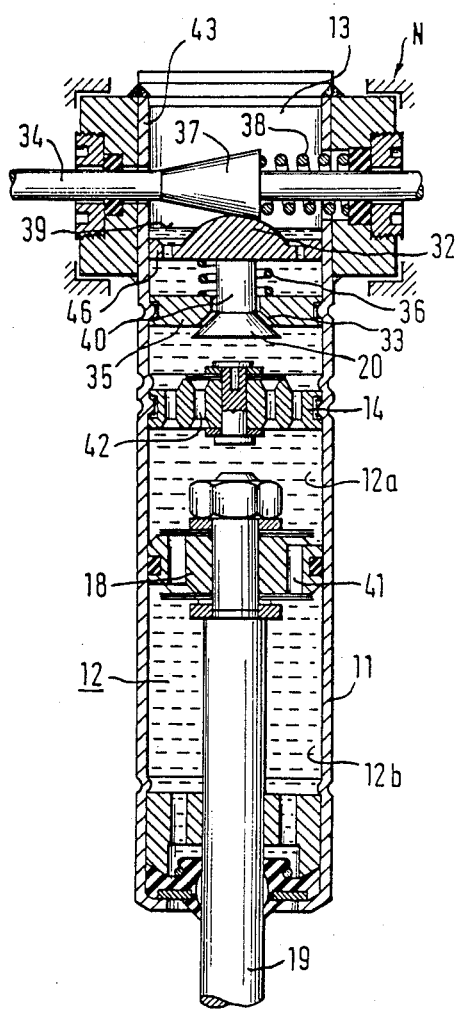
FIG. 3 shows a third embodiment of a damping unit.
Figure 2:
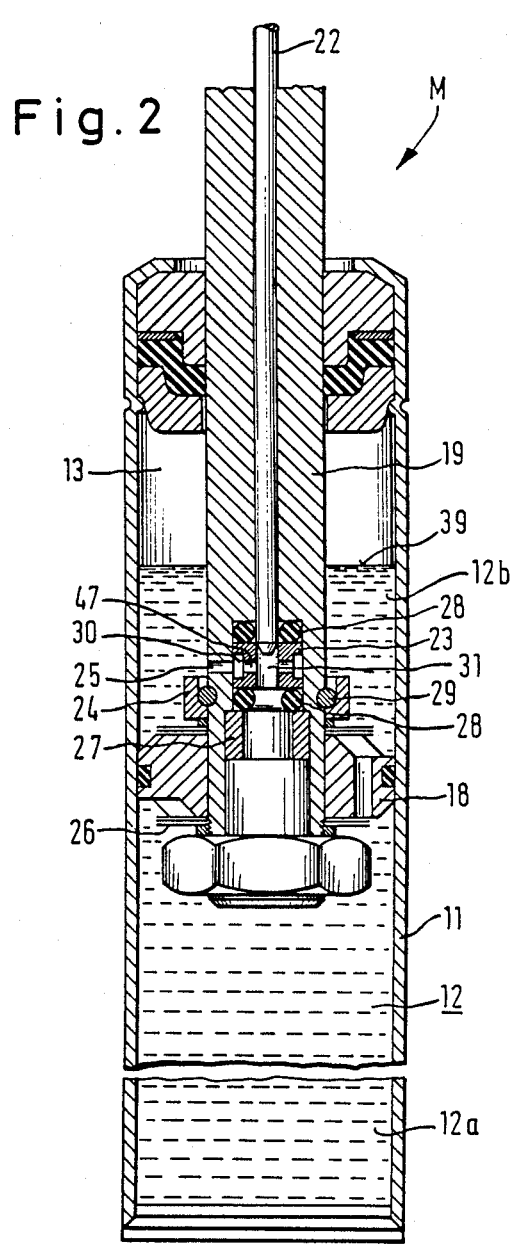
FIG. 2 shows a second embodiment of a damping unit.

Various embodiments of the damping unit are shown in FIGS. 1, 2, 3.

In the embodiment of FIG. 1, the damping unit M comprises a container 11. The container 11 defines a cavity 12 and a compensation chamber 13. The cavity 12 is subdivided by a piston unit 18 into two working chambers 12a and 12b. The piston unit 18 is fastened to a piston rod 19 axially movable through a lower end wall 40 of the container 11. The piston unit 18 is provided with a damping valve means 41. A valve plate 14 is provided within the container 11 and comprises additional damping valve means 42. A separation wall 15 is provided above the valve plate 14. The container 11 is filled up to the level 39 with a liquid. The compensation chamber 13 contains a volume of gas. The compensation chamber 13 is defined by an axial extension 43 of the container 11. The compensation chamber 13 is closed by an upper end wall 16. A control opening 21 is provided in the separating wall 15. This control opening 21 is selectively opened or closed by a frustro-conical control member 20. The control member 20 is fixed to the control shaft 17 which sealingly extends through the end wall 16. The control shaft 17 is electromagnetically operated by an actuation circuit 45.

The container 11 is connected by pivot means N to the diesel engine A.

In a normal operation of the drive belt system corresponding to the direction P of FIG. 4, the control opening 21 is open. Inward movement of the piston rod 19 is damped by the flow resistance of the damping valve means 42, no essential flow resistance occurring in the piston valve means 41, so that the working chamber 12b is refilled across the piston valve means 41. The volume of the piston rod 18 within the cavity 12 is increased on upward movement of the piston rod 19, so that a liquid is driven out through the control opening 21 of the separation wall 15. On downward movement of the piston rod 19, a small flow resistance occurs in the piston valve means 41 and a small flow resistance also occurs in the damping valve means 42, so that outward movement of the piston rod 19 is not substantially damped. It is however possible to damp also outward movement of the piston rod 19 by a corresponding design of the piston valve means 41 such that the increased flow resistance resists the flow of the liquid from the working chamber 12b to the working chamber 12a.

If the locking signal is sent to the damping unit M, the control member 20 closes the control opening 21. By this, inward movement of the piston rod 19 is locked because no escape of liquid can occur from the working chamber 12a to the compensation chamber 13 on upward movement of the piston rod 19. So the belt member G remains under sufficient tension.

The embodiment of FIG. 3 is similar to the embodiment of FIG. 1. Only the differences over FIG. 1 are described. The separation wall 35 is provided with a control opening 33. The frustro-conical control member 20 cooperates with the control opening 33. The control member 20 is fixed by a control shaft 40 to a guide plate 46. The guide plate 46 is biased in upward direction by a helical compression spring 36 supported on the separation wall 35. So the control member 20 is biased towards its closing position. An operating rod 34 extends through the extension 43 of the container 11 in a direction perpendicular to the axis of the piston rod 19. A conical cam member 37 is provided on the operating rod 34 and is biased leftwards by a helical compression spring 38. The conical cam member 37 engages a spherical counter-cam member 32 provided on the guiding member 46. The helical compression spring 38 is stronger than the helical compression spring 36, so that the control member 20 is maintained in its open position with respect to the control opening 33 if no external force is exerted onto the operating rod 34. If the control rod 34 is moved to the right in FIG. 3 by mechanical or electromagnetical actuation means, the control member 20 is moved upward by the helical compression spring 36 and the conical opening 33 is closed. The operation of the embodiment of FIG. 3 is identical with the operation of the embodiement of FIG. 1, except for the actuation of the control member 20.

The operating rod 34 extends along the axis of the pivot means N, so that actuation of this operating rod 34 is easy in spite of the mobility of the damping unit with respect to its support, i.e. the diesel engine A.

In the embodiment of FIG. 2, the piston rod 19 is provided with a central bore 31. A control rod 22 is slidably housed within the central bore 31. A locking sleeve 23 is provided within the central bore 31. The locking sleeve 23 is provided with transversal bores 47 which extend into the circumferential annular space 30. The piston rod 19 is provided with a bore 25. Damping liquid can flow through said bore 25 from the annular space 30 into the upper working chamber 12b which is adjacent to the compression space 13. The sleeve 23 is sealed by sealing rings 28 within the piston rod 19. The sleeve 23 is supported towards the working chamber 12b by a further sealing ring 28.

The piston unit 18 comprises damping valve means 26 and is secured by an abutment ring 24. The abutment ring 24 is fastened to the piston rod 19 by a slit ring 29. A downward movement of the piston rod 19 is damped by the flow resistance of the piston valve means. Upward movement of the piston rod 19 is substantially not damped, but can be damped also. On occurrence of the blocking signal to the control rod 22, the control rod 22 is moved downward with respect to the piston rod 19, so that the downward movement of the piston rod 19 is damped with higher damping force or even locked because the transversal bores 47 are closed. The control rod 22 may be actuated either mechanically or electrically.

While specific embodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

What is claimed is:

1. A belt drive system,
  comprising at least two belt pulleys (B, E),
  a belt member (G) drivingly interconnecting said belt pulleys (B, E),
  a tensioning member (H) acting onto a belt section of said belt member between said pulleys (B, E), said tensioning member (H) being biased against said belt section along a tensioning member movement path (R) such as to provide a belt tension being responsive to the driving direction (P) of said belt drive system, a higher tension of said belt member (G) occurring in a normal driving direction (P) of said belt drive system and a lower belt tension occurring in a reverse driving direction of said belt drive system,
  a fluid-operated damping unit (M) acting onto said tensioning member (H) for damping the movement of said tensioning member (H) along said tensioning member movement path (R),
  said fluid-operated damping unit (M) comprising two damper components (11, 19) movable with respect to each other in response to the movement of said tensioning member (H) along said tensioning member movement path (R), said damper components (11, 19) defining at least two fluid spaces (12, 13) the volume ratio of which is variable in response to relative movement of said damper components (11, 19), said fluid spaces (12, 13) being interconnected by fluid passage means (21) allowing a fluid flow between said fluid spaces (12, 13) in opposite directions respectively in response to the direction of movement of said tensioning member (H) along said tensioning member movement path, fluid passage control means (20) being provided for reducing the flow cross section of said fluid passage means (21) for at least the flow direction which corresponds to the direction of movement of said tensioning member (H) in the direction $R_1$ resulting in a reduced tension of said belt member (G),
  said fluid passage control means (20) being controlled such that said flow cross section is reduced in response to the occurrence of at least one of the following situations:
  (a) reverse driving direction of the belt drive system occurs;
  (b) operational conditions occur under which occurrence of the reverse driving direction of the belt drive system is expectable.

2. A belt drive system as set forth in claim 1, one of said damper components comprising a container (11) having an axis and two ends and defining a cavity (12) therein, the other one of said components comprising a piston rod (19) movable inwards and outwards of said cavity (12) through one (40) of said ends along said axis and being provided with a piston unit (18) within said cavity (12), said piston unit (18) defining two working chambers (12a, 12b) within said cavity, said working chambers (12a, 12b) being interconnected by piston passage means (41), one (12a) of said working chambers being adjacent to a compensation chamber (13), said working chambers (12a, 12b) containing a liquid, said compensation chamber (13) containing a volume of gas, the liquid associated to said one working chamber (12a) being subdivided by separating means (15), said fluid passage means (21) extending across said separating means (15).

3. A belt drive system as set forth in claim 2, said compensation chamber (13) being provided in an axial extension (43) of said container (11), said fluid passage means (21) being provided in a separating wall (15) subdividing said liquid associated to said one working chamber (12a), said separating wall (15) having an axially directed control opening (21), an axially movable control member (20) cooperating with said control opening (21).

4. A belt drive system as set forth in claim 3, said control member (20) being provided with an axially directed control shaft (17) guided in axial direction through an end wall (16) of said extension (43).

5. A belt drive system as set forth in claim 3, said control member (20) being operable through cam means (37, 32) by an operating member (34) extending through said axial extension (43) in a direction transverse to said axis.

6. A belt drive system as set forth in claim 5, said operating member (34) extending along a pivot axis of pivot means (N) adapted for pivotally connecting said container with container support means (A).

7. A belt drive system as set forth in claim 1, one of said damper components comprising a container (11) having an axis and two ends and defining a cavity (12) therein, the other one of said components comprising a piston rod (19) movable inwards and outwards of said cavity (12) through one of said ends along said axis and being provided with a piston unit (18) within said cavity (12), said piston unit (18) defining two working chambers (12a, 12b) within said cavity (12), said working chambers being interconnected by piston passage means (25, 30, 47, 31), one (12a) of said working chambers containing a liquid, the other (12b) of said working chambers containing a volume of a liquid and a volume of gas, said piston rod (19) having an axial bore (31), said axial bore (31) accommodating at least part (22) of said fluid control means, said fluid control means controlling the flow cross section of said piston passage means (25, 30, 47, 31).

8. A belt drive system as set forth in claim 1, said fluid control means (20) permitting complete closing of said fluid passage means (21).

9. A belt drive system as set forth in claim 1, said fluid control means (20) being mechanically operated fluid control means.

10. A belt drive system as set forth in claim 1, said fluid control means (20) being electro-magnetically operated fluid control means.

11. A belt drive system,
comprising at least two belt pulleys (B, E),
a belt member (G) drivingly interconnecting said belt pulleys (B, E),
a tensioning member (H) acting onto a belt section of said belt member (G) between said pulleys (B, E), said tensioning member (H) being biased against said belt section along a tensioning member movement path (R) such as to provide a belt tension, said belt tension being responsive to the driving direction (P) of said belt drive system, a higher tension of said belt member (G) occurring in a normal driving direction (P) of said belt drive system and a lower belt tension occurring in a reverse driving direction of said belt drive system,
a damping unit (M) acting onto said tensioning member (H) for damping the movement of said tensioning member along said tensioning member movement path (R),
said damping unit (M) comprising two damper components (11, 19) movable with respect to each other in response to the movement of said tensioning member (H) along said tensioning member movement path (R), damping means providing a damping force resisting to relative movement of said damper components (11, 19) damping force control means (21, 20) being provided for varying said damping force,
said damping force control means (20, 21) being controlled to vary the cross-sectional area of the control opening such that said damping force is increased in response to the occurrence of at least one of the following situations:
(a) reverse driving direction of the belt drive system occurs;
(b) operational conditions occur under which occurrence of the reverse driving direction of the belt drive system is expectable.

12. A belt drive system as set forth in claim 11, said damping force control means (20, 21) being such that said damping force is increased up to a locking value.

13. A belt drive system as set forth in claim 1 or 11, said control means (20, 21) being responsive to an ignition lock of a combustion engine (A), one (B) of said belt pulleys (B, E) being driven by said combustion engine (A).

14. A belt drive system as set forth in claim 1 or 11, one (B) of said belt pulleys (B, E) being driven by a diesel engine (A).

* * * * *